US010727500B2

(12) United States Patent
Sugita

(10) Patent No.: US 10,727,500 B2
(45) Date of Patent: Jul. 28, 2020

(54) METHOD OF MANUFACTURING A FUEL CELL MODULE

(71) Applicant: TOYOTA JIDOSHA KABUSHIKI KAISHA, Toyota-shi, Aichi-ken (JP)

(72) Inventor: Kazumi Sugita, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/157,620

(22) Filed: Oct. 11, 2018

(65) Prior Publication Data

US 2019/0123361 A1 Apr. 25, 2019

(30) Foreign Application Priority Data

Oct. 19, 2017 (JP) .................. 2017-202365

(51) Int. Cl.
*H01M 8/04313* (2016.01)
*H01M 8/0202* (2016.01)
*H01M 8/00* (2016.01)
*H01M 8/0273* (2016.01)
*H01M 8/0206* (2016.01)

(52) U.S. Cl.
CPC ......... *H01M 8/0202* (2013.01); *H01M 8/006* (2013.01); *H01M 8/0273* (2013.01); *H01M 8/0206* (2013.01); *H01M 8/04313* (2013.01)

(58) Field of Classification Search
None
See application file for complete search history.

(56) References Cited

FOREIGN PATENT DOCUMENTS

| JP | 2005-093395 A | 4/2005 |
|---|---|---|
| JP | 2008-186673 A | 8/2008 |
| JP | 2013-120655 A | 6/2013 |
| JP | 2017-117780 A | 6/2017 |

OTHER PUBLICATIONS

U.S. Appl. No. 16/014,204, filed Jun. 21, 2018.
U.S. Appl. No. 15/966,357, filed Apr. 30, 2018.

*Primary Examiner* — Yoshitoshi Takeuchi
(74) *Attorney, Agent, or Firm* — Hunton Andrews Kurth LLP

(57) ABSTRACT

A cell monitor connector is inserted with a first surface following a guide portion. When the cell monitor connector is further inserted, the cell monitor connector makes contact with a projection portion. In a state where the attachment is completed, the projection portion is elastically deformed so as to press a second surface. Due to this force, the cell monitor connector is held such that it is sandwiched between the projection portion and the guide portion.

4 Claims, 9 Drawing Sheets

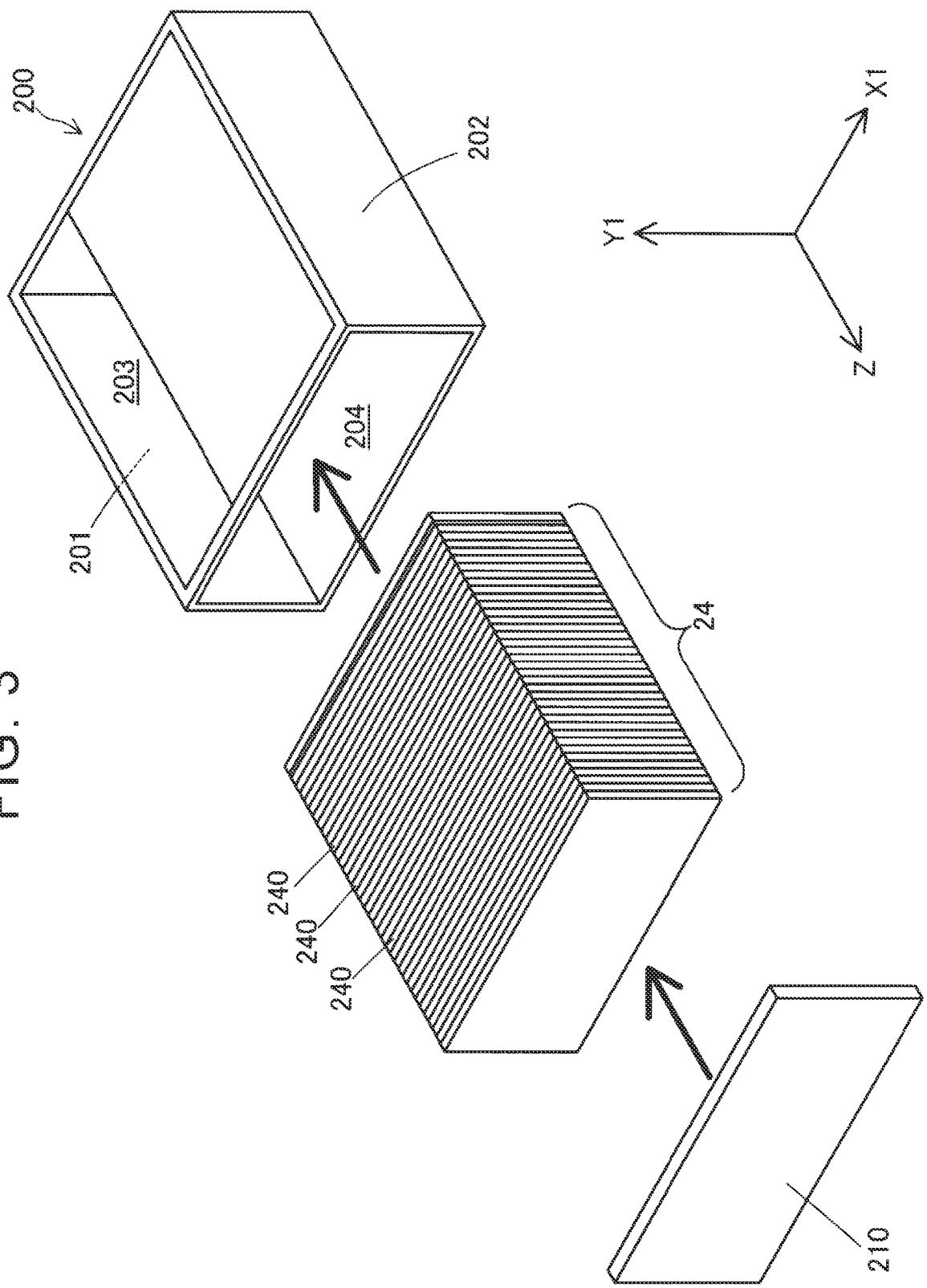

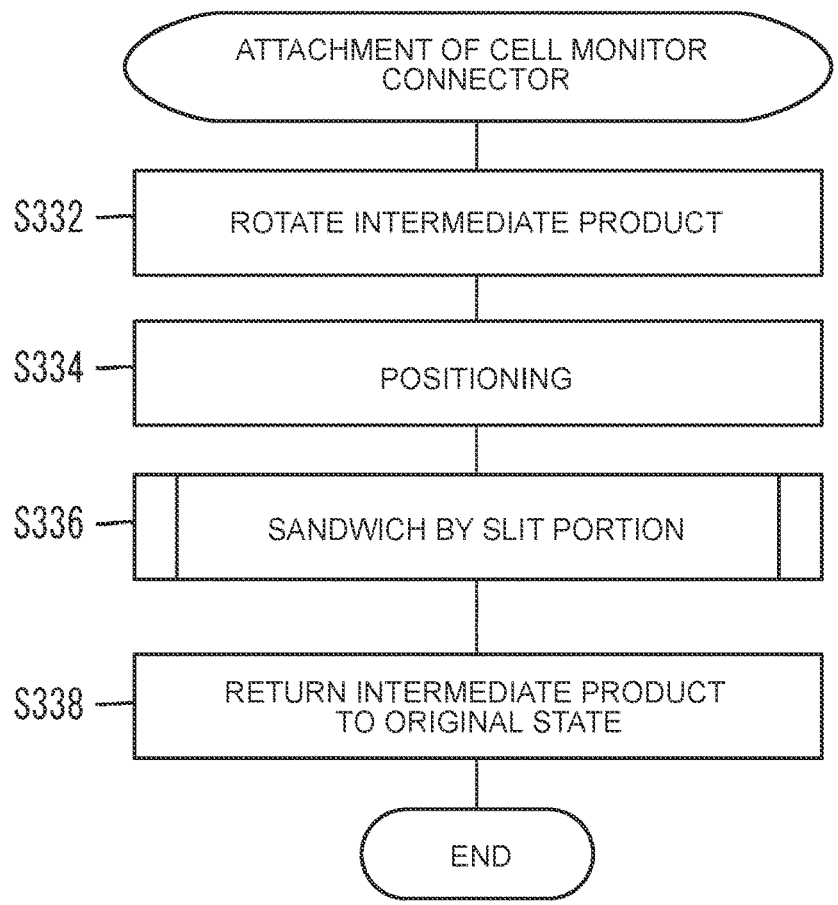
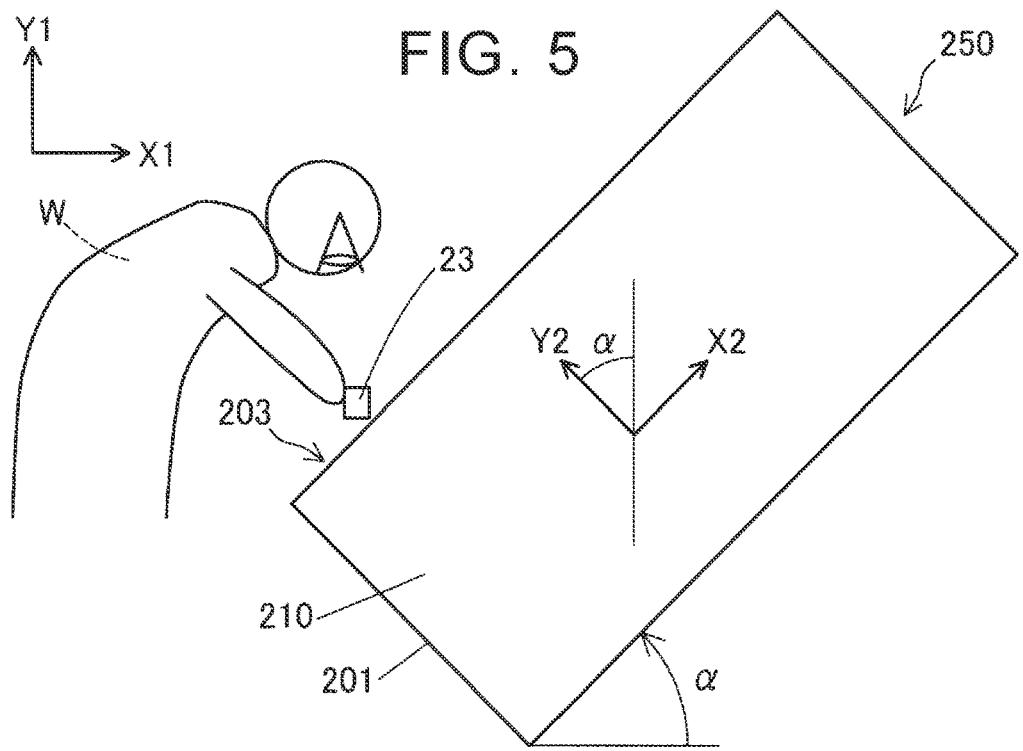

METHOD OF MANUFACTURING A FUEL CELL MODULE

INCORPORATION BY REFERENCE

The disclosure of Japanese Patent Application No. 2017-202365 filed on Oct. 19, 2017 including the specification, drawings and abstract is incorporated herein by reference in its entirety.

BACKGROUND

1. Technical Field

This disclosure relates to an attachment method of a cell monitor connector to a cell of a fuel cell and a fuel cell module.

2. Description of Related Art

Japanese Unexamined Patent Application Publication No. 2013-120655 (JP 2013-120655 A) describes a technique in which a notch is provided in a corner of a frame member constituting a cell of a fuel cell, and a cell monitor connector is attached, by insertion, to a separator exposed from the notch. In a state where the cell monitor connector is attached, the notch includes walls between which opposite side surfaces of the cell monitor connector are sandwiched. A gap between the walls is slightly larger than the width of the cell monitor connector. On this account, when the cell monitor connector is positioned to enter the gap between the walls and then inserted into the notch, the cell monitor connector can be attached to the separator.

SUMMARY

In the technique in the related art, if the positioning is displaced toward either one of the walls, the cell monitor connector and the either one of the walls interfere with each other, so that the cell monitor connector cannot be inserted into the notch. On this account, it is necessary for an operator to position the cell monitor connector by taking the measure of a positional relationship between the cell monitor connector and the walls, and thus, workability is low. In view of this, an object of this disclosure is to improve workability of attachment of a cell monitor connector.

A first aspect of the disclosure relates to an attachment method for attaching a cell monitor connector to a first separator included in a cell of a fuel cell, the cell monitor connector including a housing and a connection terminal accommodated in the housing, the cell monitor connector being electrically connected to the cell of the fuel cell. The cell includes a second separator, and a frame-shaped insulating sheet sandwiched between the first separator and the second separator and configured to insulate the first separator from the second separator. The first separator includes an exposed portion exposed from the insulating sheet and making contact with the cell monitor connector in a state where the cell monitor connector is attached to the first separator. The exposed portion includes an attachment portion making contact with the connection terminal in the state where the cell monitor connector is attached to the first separator, and a guide portion making contact with a first surface of the housing. The insulating sheet includes a projection portion projecting toward the guide portion at a position facing the guide portion. A gap between the guide portion and the projection portion in a state where the cell monitor connector is not attached is narrower than a distance between the first surface and a second surface facing the first surface in the housing. The attachment method includes: a positioning step performed by bringing the first surface into contact with the guide portion; and a step of elastically deforming the projection portion due to contact with the second surface by moving the cell monitor connector to a predetermined position with the first surface following the guide portion, so as to sandwich the attachment portion by a slit portion provided in a distal end of the housing. With this configuration, the housing is positioned by the first surface, that is, with respect to one place, so that workability improves. Further, in a state where the attachment is completed, the projection portion is elastically deformed, so that the housing is sandwiched between the projection portion and the guide portion. Thus, the cell monitor connector is held.

The insulating sheet may be made of resin, and the first separator may be made of metal. With this configuration, elastic deformation of the projection portion can be realized easily.

The positioning step may include a step of sandwiching the guide portion by a corner of the slit portion before the first surface is brought into contact with the guide portion. After the guide portion is sandwiched by the corner of the slit portion, the cell monitor connector may be moved toward the predetermined position, so that the first surface is brought into contact with the guide portion. With such a configuration, when the guide portion is sandwiched by the corner of the slit portion, the positioning operation can be easily performed.

The attachment method may further include, before the positioning step, a step of rotationally moving an intermediate product including the cell so that a direction where the cell monitor connector is moved along the guide portion becomes a vertical direction. With such a configuration, the positioning step can be easily performed.

A second aspect of the disclosure relates to a fuel cell module including (a) a cell of a fuel cell, the cell including a first separator, a second separator, and an insulating sheet configured to insulate the first separator from the second separator, and (b) a cell monitor connector including a housing, and a connection terminal accommodated in the housing, the cell monitor connector being attached to the first separator. The housing includes a first surface, and a second surface facing the first surface. The first separator includes an exposed portion exposed from the insulating sheet and making contact with the cell monitor connector. The exposed portion includes an attachment portion making contact with the connection terminal, and a guide portion making contact with the first surface. The insulating sheet includes a projection portion projecting toward the guide portion at a position facing the guide portion and configured to press the second surface.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a perspective view illustrating a state of assembling of the fuel cell module;

FIG. 4 is a flowchart illustrating a procedure of attachment of a cell monitor connector;

FIG. 5 is a side view illustrating a state where an intermediate product is rotated;

DETAILED DESCRIPTION OF EMBODIMENTS

Figure 1:
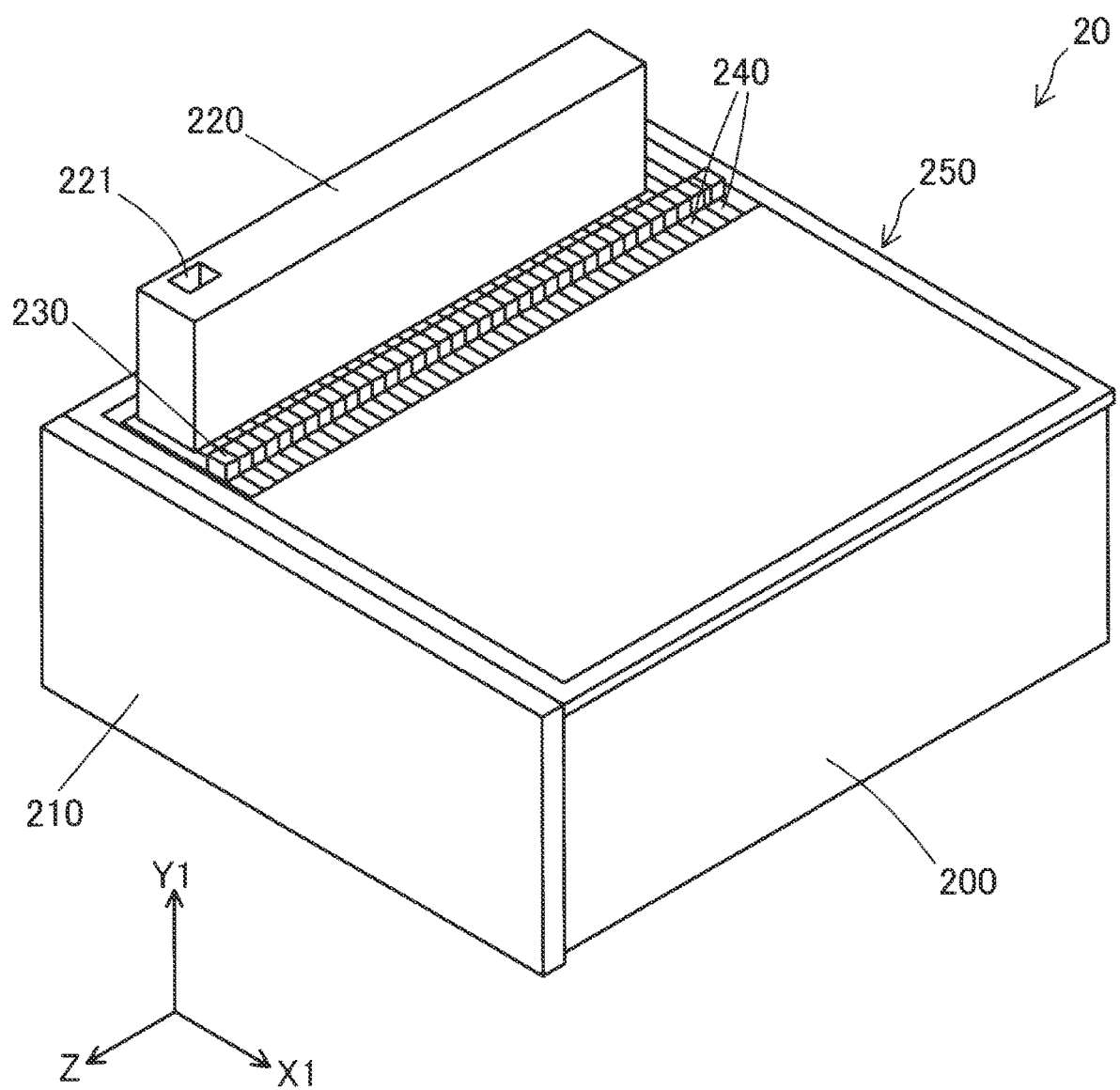
FIG. 1 is a perspective view illustrating a fuel cell module.

FIG. 1 is a perspective view illustrating a fuel cell module 20. The fuel cell module 20 includes a case 200, an end plate 210, a cell monitor 220, a plurality of cell monitor connectors 230, and a plurality of cells 240. All the cells 240, the case 200, and the end plate 210 are also collectively referred to as an intermediate product 250.

Figure 7:
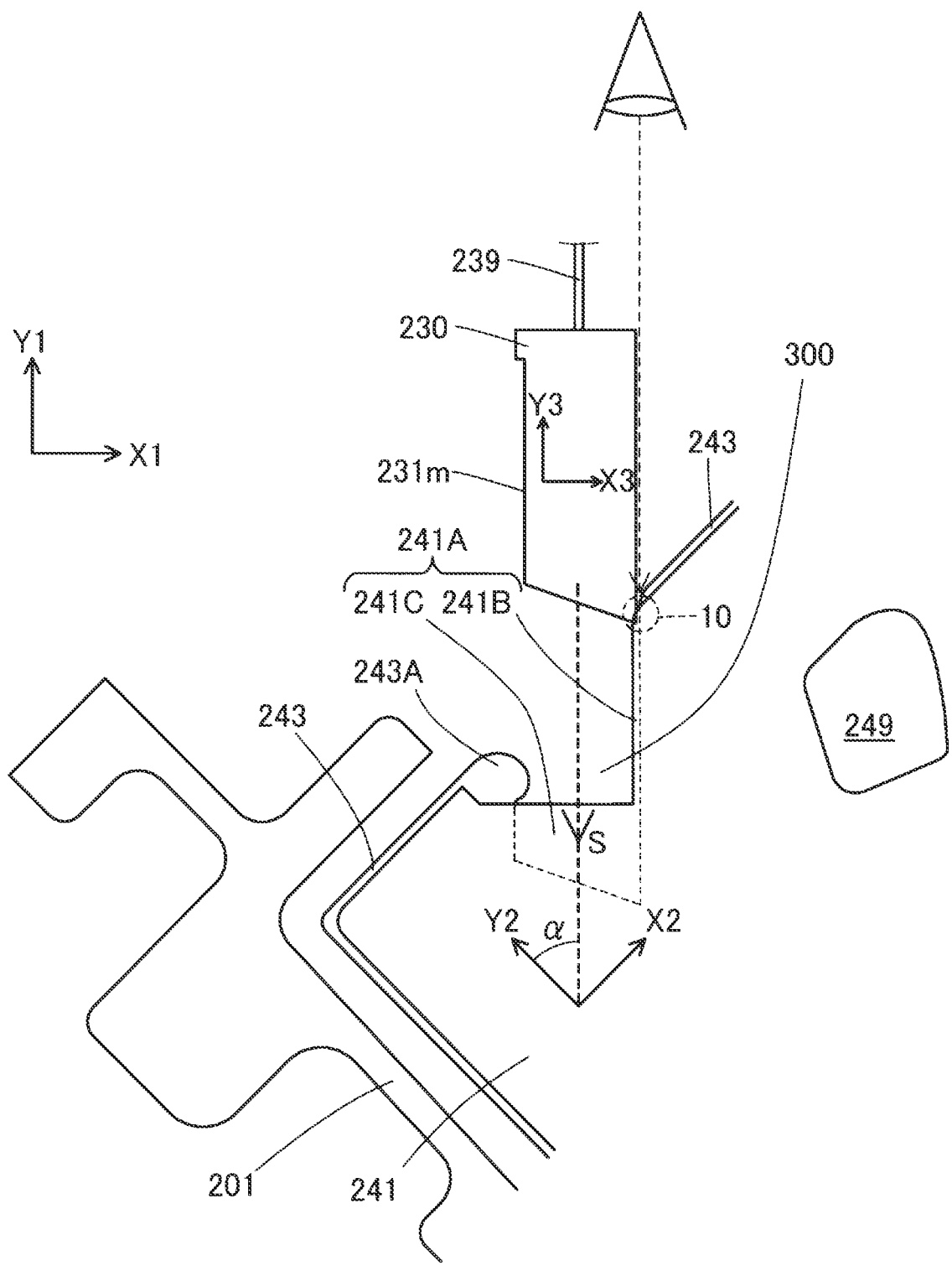
FIG. 7 is a view illustrating a state where the cell monitor connector is being attached.

The cells 240 are accommodated in the case 200. The cell monitor 220 is fixed to an upper part of the case 200. Each of the cell monitor connectors 230 is a component electrically connected to a corresponding cell 240 for a fuel cell so as to measure a power generation voltage. Each of the cell monitor connectors 230 is connected to the cell monitor 220 via a cable 239 (FIG. 7, and so on).

An X1-Y1-Z coordinate system that is a right-handed rectangular coordinate system is defined as illustrated in FIG. 1. A Z-X1 plane is parallel to a horizontal plane. A positive side in a Y1-direction indicates an upper side in a vertical direction, and a negative side in the Y1-direction indicates a lower side in the vertical direction. An X1-Y1 plane is parallel to a surface direction of the cells 240. A Z-direction is parallel to a laminating direction of the cells 240.

A connecting portion 221 is provided in an upper part of the cell monitor 220. When a plug to be connected to a cell-voltage detecting circuit is inserted into the connecting portion 221, a detection result by the cell monitor 220 can be input into the detecting circuit.

Figure 2:
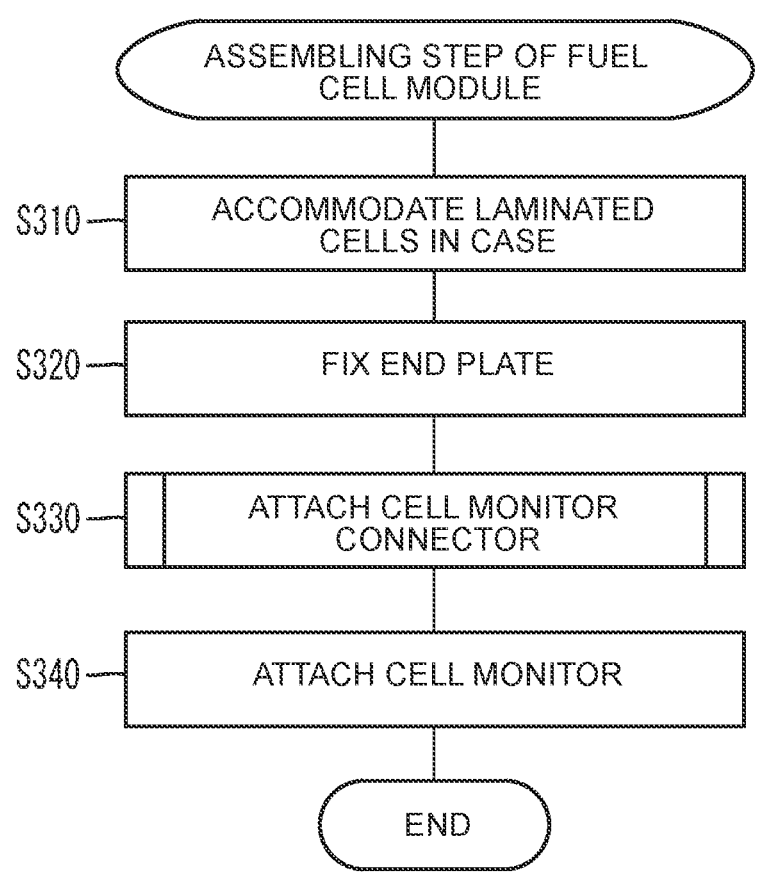
FIG. 2 is a flowchart illustrating an assembling step of the fuel cell module.

FIG. 2 is a flowchart illustrating an assembling step of the fuel cell module 20. First, as illustrated in FIG. 3, an operator accommodates a laminated body 24 in the case 200 (S310). The laminated body 24 indicates the laminated cells 240.

As illustrated in FIG. 3, the case 200 includes a first side wall 201, a second side wall 202, an upper opening 203, and a transverse opening 204. The first side wall 201 and the second side wall 202 have surfaces perpendicular to the X1-Y1 plane. That is, the first side wall 201 and the second side wall 202 have surfaces perpendicular to the surface direction of the cells 240. The upper opening 203 opens a top face of the case 200. The upper opening 203 is positioned closer to the first side wall 201 than the second side wall 202.

The transverse opening 204 opens a lateral side of the case 200. The operator inserts the laminated body 24 into the case 200 through the transverse opening 204. On this account, the operator moves the laminated body 24 relative to the case 200 along the Z-direction (that is, the laminating direction of the laminated body 24).

Subsequently, the operator fixes the end plate 210 (S320). Hereby, the intermediate product 250 is completed. Then, the operator attaches the cell monitor connectors 230 to the intermediate product 250 (S330). Subsequently, the operator attaches the cell monitor 220 to the intermediate product 250 (S340). Thus, the fuel cell module 20 is completed.

FIG. 4 is a flowchart illustrating a procedure of attachment of the cell monitor connector 230 (S330). First, an operator W rotates the intermediate product 250 (S332). The operator W is an operator who performs S330. An operator without any reference sign is an operator who performs operations other than S330. However, the operator W may perform the operations other than S330.

FIG. 5 illustrates a state where the intermediate product 250 is rotated. The intermediate product 250 is fixed in a state where the intermediate product 250 is rotated by α degrees around the Z-direction. A machine (not shown) is used for rotation and fixation of the intermediate product 250. In the present embodiment, "α degrees" indicates 45 degrees.

As illustrated in FIG. 5, an X2-Y2-Z coordinate system is defined with respect to the intermediate product 250. The X2-Y2-Z coordinate system is the same as the X1-Y1-Z coordinate system before the intermediate product 250 is rotated. Since the X2-Y2-Z coordinate system is defined with respect to the intermediate product 250, the X2-Y2-Z coordinate system is rotated along with the rotation of the intermediate product 250. On this account, an angle formed between the Y1-direction and a Y2-direction is α degrees.

Then, the operator W positions a connector unit 23 constituted by five cell monitor connectors 230 with respect to target cells 240 for attachment (S334). The following will describe the connector unit 23, and after that, the positioning will be described.

Figure 6:
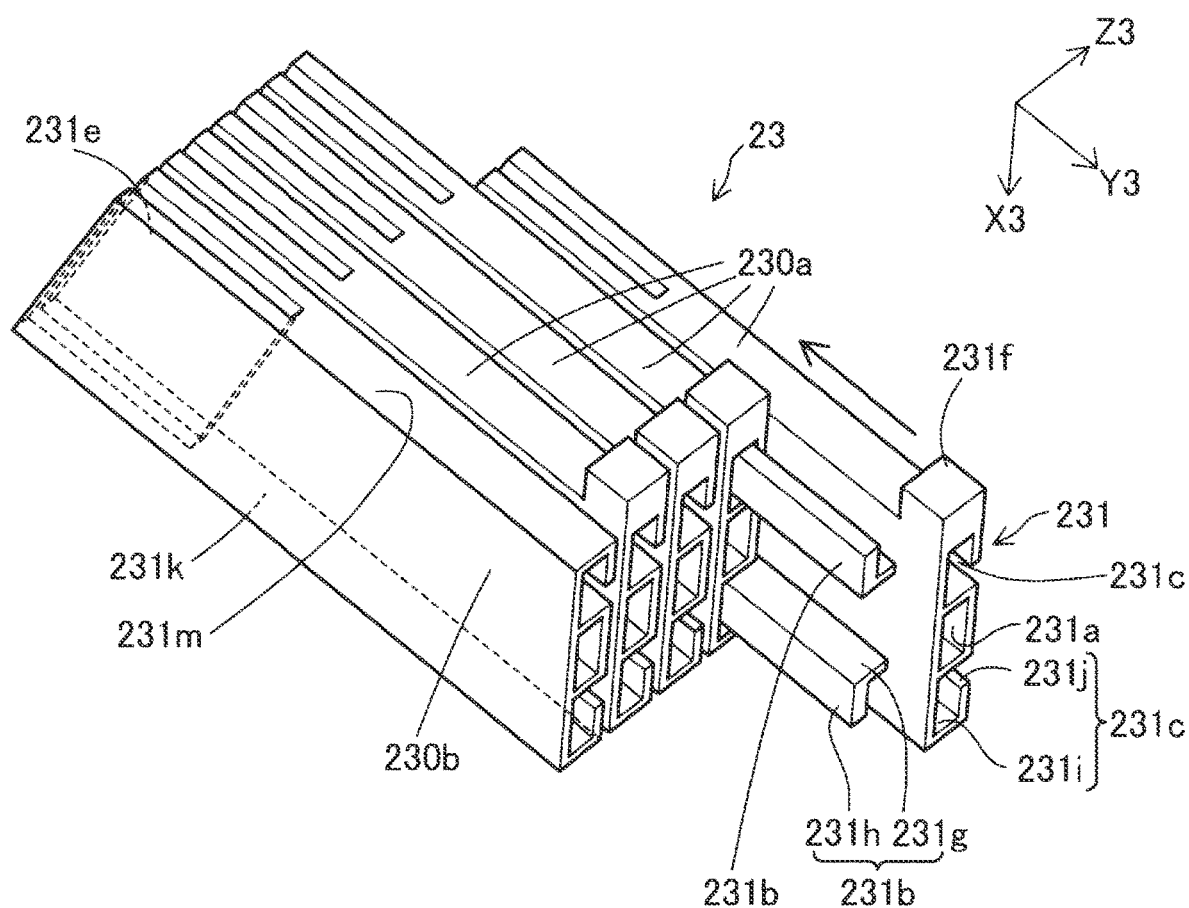
FIG. 6 is a perspective view of a connector unit.

FIG. 6 is a perspective view of the connector unit 23. More precisely, FIG. 6 illustrates a state where the connector unit 23 is being assembled.

The connector unit 23 is constituted by four first connectors 230a and one second connector 230b. When the first connectors 230a and the second connector 230b are not distinguished from each other, they are referred to as the cell monitor connector 230.

Figure 11:
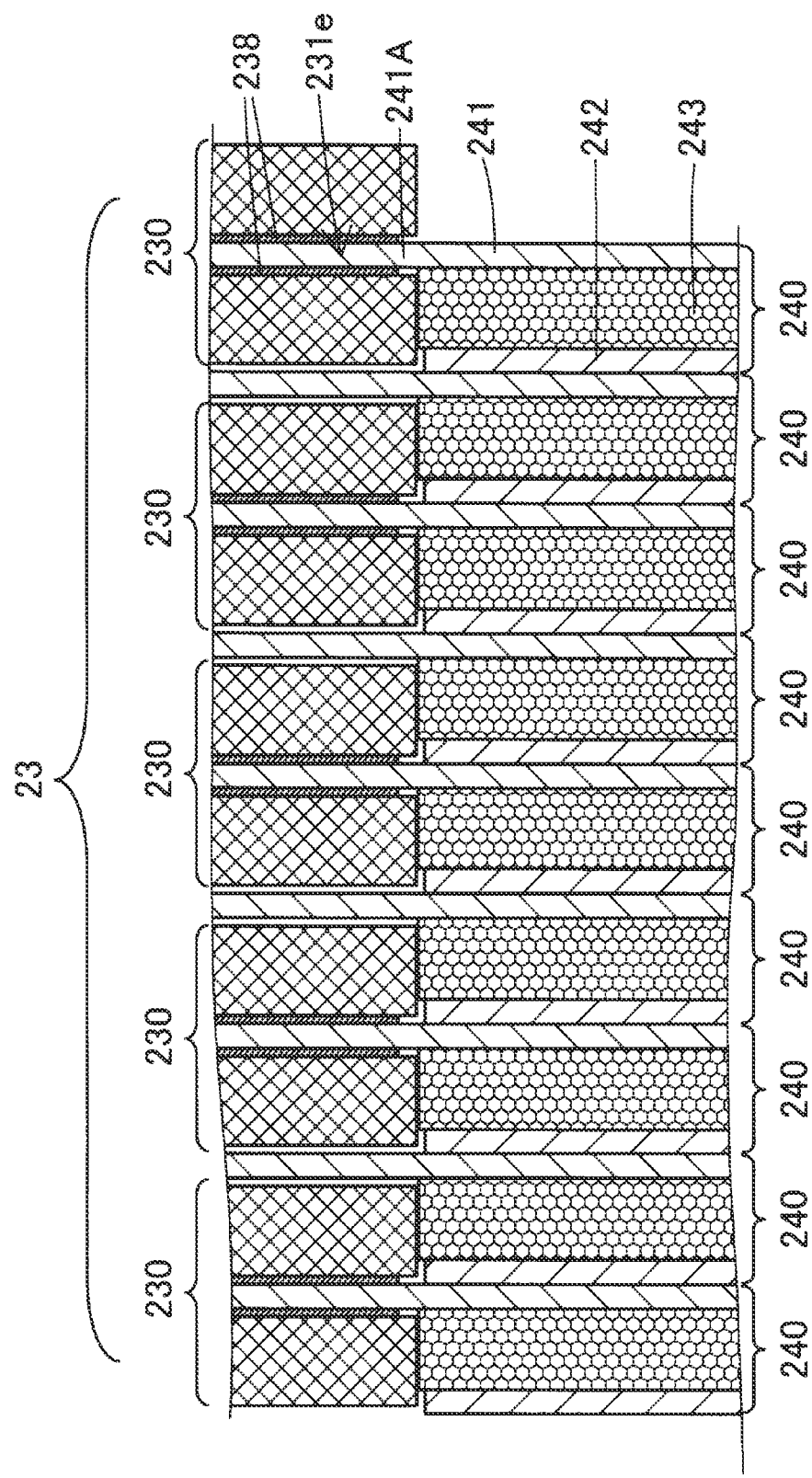
FIG. 11 is a sectional view taken along a line 11-11 in FIG. 9.

The cell monitor connector 230 includes a housing 231 and a connection terminal 238 (FIG. 11). The connection terminal 238 is provided in each of the housings 231 so as to electrically connect a first separator to the cable 239. The first connector 230a and the second connector 230b are different from each other only in a shape of the housing 231. In FIG. 6, the cable 239 and the connection terminal 238 are omitted.

An X3-Y3-Z3 coordinate system that is a right-handed rectangular coordinate system is defined with respect to the connector unit 23. A Z3-direction is an arrangement direction of the cell monitor connectors 230. A side where the second connector 230b is placed is a negative side. A Y3-direction is a longitudinal direction of the cell monitor connectors 230. A side where distal ends of the cell monitor connectors 230 are provided is a negative side. An X3-direction is a short direction of the cell monitor connectors 230. A side where protruding portions 231f (described later) are placed is a negative side.

A material for the housing 231 is resin having an insulating property. The housing 231 includes a penetration portion 231a, two engageable male portions 231b, two engageable female portions 231c, a slit portion 231e, and the protruding portion 231f. Among them, the protruding portion 231f and the two engageable male portions 231b are not provided in the housing 231 of the second connector 230b.

The penetration portion 231a penetrates through generally the center, in the X3-direction, of the housing 231 along the Y3-direction. The connection terminal 238 is accommodated in the penetration portion 231a.

The engageable male portion 231b is a part to be connected to its adjacent cell monitor connector 230. The two engageable male portions 231b are provided on a surface of the housing 231 on the negative side in the Z3-direction. The two engageable male portions 231b are provided at an interval in the X3-direction of the housing 231.

The engageable male portion 231b is a part extending along the Y3-direction. The engageable male portion 231b includes a first part 231g and a second part 231h. The first part 231g and the second part 231h form an L-shape when they are viewed from the Y3-direction. The first part 231g corresponds to a crossbar in the L-shape and connects a base portion of the housing 231 to the second part 231h. The second part 231h corresponds to a vertical bar in the L-shape.

The second part 231h of the engageable male portion 231b on a negative side in the X3-direction projects upward from the first part 231g, and the second part 231h of the engageable male portion 231b on a positive side in the X3-direction projects downward from the first part 231g. On this account, the engageable male portion 231b on the negative side in the X3-direction looks like an L-shape when it is viewed from a positive side in the Y3-direction, as illustrated in FIG. 6. In the meantime, the engageable male portion 231b on the positive side in the X3-direction looks like an L-shape when it is reversed in terms of the X3-direction and viewed from a negative side in the Y3-direction.

The engageable female portion 231c includes an insertion portion 231i and a notch portion 231j. The second part 231h of the adjacent first connector 230a on a positive side in the Z3-direction is inserted into the insertion portion 231i. The insertion portion 231i is placed to sandwich the penetration portion 231a in the X3-direction. The insertion portion 231i is a space having a generally rectangular shape when it is viewed from the Y3-direction.

The first part 231g of the adjacent first connector 230a on the positive side in the Z3-direction is inserted into the notch portion 231j. The notch portion 231j is a space continuous with the insertion portion 231i.

The engagement between the engageable male portion 231b and the engageable female portion 231c allows movement in the Y3-direction. Further, the engageable male portion 231b has a gap with respect to the engageable female portion 231c in terms of a Z3-X3 plane direction. On this account, the operator W can displace a relative positional relationship between adjacent cell monitor connectors 230 to some extent while a state where they are assembled as the connector unit 23 is maintained. Hereby, even if assembling positions of the cells 240 are displaced from each other to some extent, the five cell monitor connectors 230 as the connector unit 23 can be assembled at once.

The slit portion 231e is a slit provided so that a first separator 241 (FIG. 7) as a part of the cell 240 is put therein.

The protruding portion 231f is provided in the housing 231 of the first connector 230a so that the operator can easily distinguish a positive side of the cell monitor connector 230 in the X3-direction from a negative side thereof and can easily distinguish the first connectors 230a from the second connector 230b.

A surface of the housing 231, parallel to a Y3-Z3 plane and positioned on the positive side in the X3-direction, is referred to as a first surface 231k. A surface of the housing 231, parallel to the Y3-Z3 plane and positioned on the negative side in the X3-direction, is referred to as a second surface 231m. The second surface 231m faces the first surface 231k. That is, the second surface 231m is a surface on the opposite side from the first surface 231k.

A part to which the cell monitor connector 230 is attached is a part exposed from the case 200 in the upper opening 203 as illustrated in FIG. 1. As illustrated in FIG. 5, the upper opening 203 is closer to the first side wall 201 than the second side wall 202. On this account, as illustrated in FIG. 5, the operator W is positioned beside the first side wall 201 and performs operations as S334 and S336.

Figure 8:
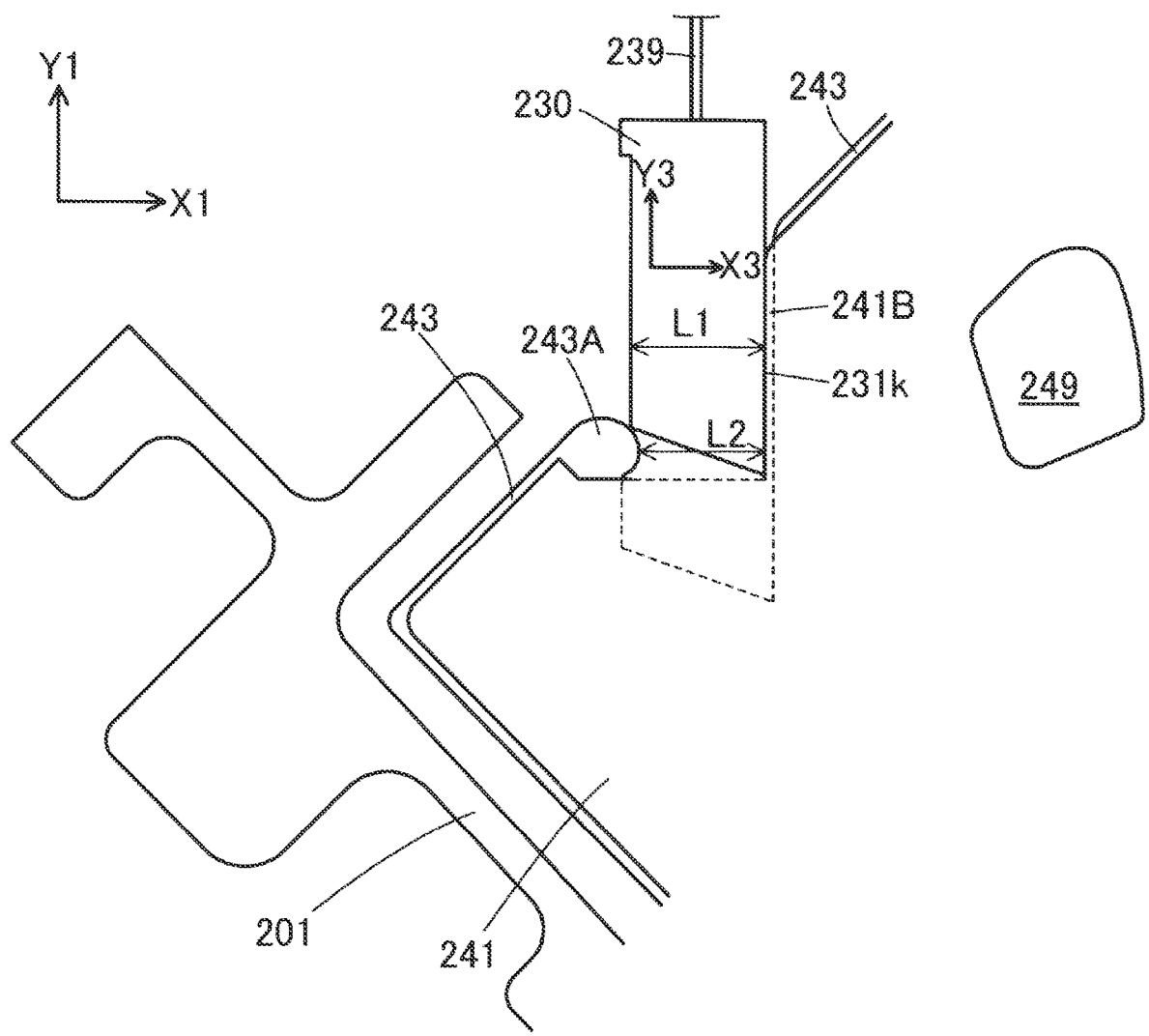
FIG. 8 is a view illustrating a state where the cell monitor connector is being attached.
Figure 9:
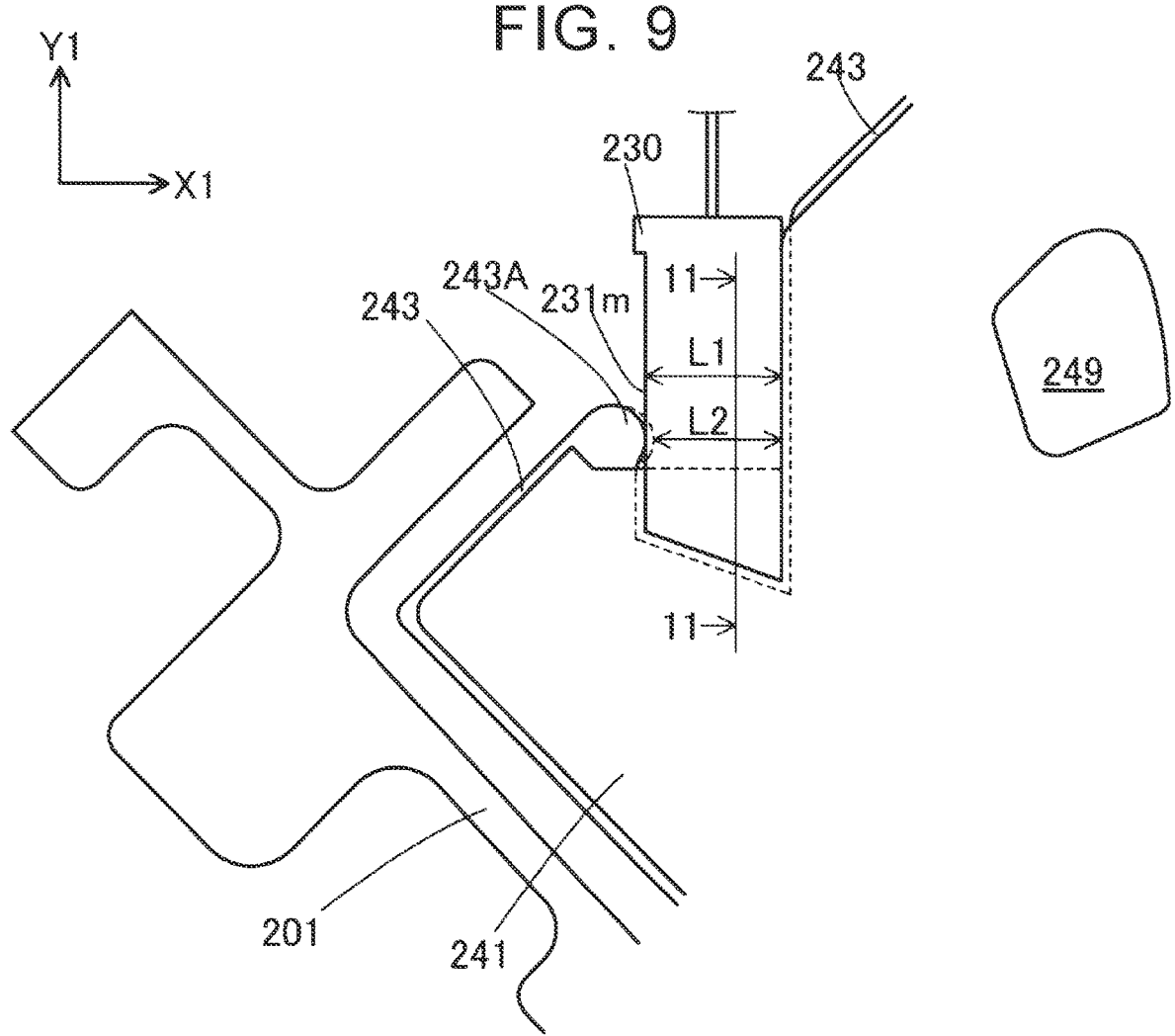
FIG. 9 is a view illustrating a state where the cell monitor connector has been attached.

Positioning performed as S334 will be described. FIGS. 7 to 11 are views to specifically describe S334 and S336. FIGS. 7 to 9 illustrate the first side wall 201, one cell 240, and one cell monitor connector 230. A section of the first side wall 201 is illustrated. Sections of the one cell 240 and the one cell monitor connector 230 are not illustrated, but side faces thereof are illustrated.

Figure 10:
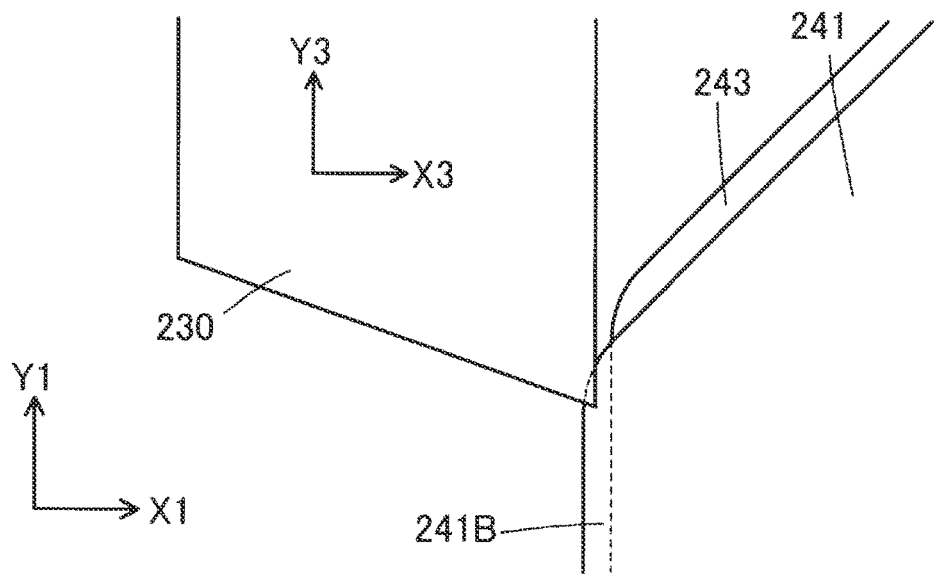
FIG. 10 is an enlarged view of a part 10 in FIG. 7.

FIGS. 7 to 9 sequentially illustrate a state where the cell monitor connector 230 is attached. FIG. 10 is an enlarged view of a part 10 in FIG. 7. FIG. 11 illustrates an 11-11 section in FIG. 9. FIG. 11 illustrates a state where one connector unit 23, that is, five cell monitor connectors 230 are attached to the cells 240.

As illustrated in FIG. 11, the cell 240 includes the first separator 241, a second separator 242, and an insulating sheet 243. A main material for the first separator 241 and the second separator 242 is metal, more specifically, titanium. A main material for the insulating sheet 243 is resin, more specifically, PET resin. PET indicates polyethylene terephthalate. The first separator 241 and the second separator 242 have a thickness of about 0.1 mm. The insulating sheet 243 has a thickness of about 0.3 mm.

The insulating sheet 243 insulates the first separator 241 from the second separator 242. Further, the insulating sheet 243 has a function to bond the first separator 241 to the second separator 242, and a function to cut off gas between the first separator 241 and the second separator 242. The insulating sheet 243 is a frame-shaped member surrounding a membrane electrode assembly (not shown). The membrane electrode assembly is placed near the center of an X2-Y2 plane, and therefore, it is not illustrated on the 11-11 section.

As illustrated in FIG. 11, one cell monitor connector 230 is attached to every set of two first separators 241. As such, the number of cell monitor connectors 230 to be attached is a half of the number of cells 240, so that the operation time is shortened. Note that, when one cell monitor connector 230 is attached to every set of two first separators 241, a power generation voltage of corresponding two cells 240 is measured by the one cell monitor connector 230.

A most part of the cell 240 illustrated in FIGS. 7 to 9 is the first separator 241. In a part other than an exposed portion 241A (described later), the insulating sheet 243 protrudes from respective edges of the first separator 241 and the second separator 242 in terms of an X2-Y2 plane direction. The reason why the insulating sheet 243 protrudes as such is to secure the insulating property.

A notch 300 is provided in the first separator 241. The notch 300 has such a shape that a part of a margin of the first separator 241 is cut out. The exposed portion 241A is provided in the first separator 241 around the notch 300. As illustrated in FIG. 11, in order to attach the cell monitor connector 230, the exposed portion 241A is exposed from the insulating sheet 243 and the second separator 242. That is, differently from other parts of the first separator 241, the exposed portion 241A is bare without being covered with the insulating sheet 243 and the second separator 242.

The exposed portion 241A includes a guide portion 241B and an attachment portion 241C. The connection terminal 238 makes contact with the first separator 241 in the attachment portion 241C, so as to be conductive with the first separator 241. A function of the guide portion 241B will be described later.

The insulating sheet 243 includes a projection portion 243A. The projection portion 243A is a part that projects toward the guide portion 241B at a position facing the guide portion 241B.

As illustrated in FIGS. 7 and 10, the operator W sandwiches the guide portion 241B by a corner of the slit portion 231e as an initial operation of S334. The corner of the slit portion 231e as used herein indicates an end of the slit portion 231e on the positive side in the X3-direction and an end thereof on the negative side in the Y3-direction.

When the operator W sandwiches the guide portion 241B by the corner of the slit portion 231e, the operator W moves the cell monitor connector 230 toward the attachment portion 241C. Hereinafter, to move the cell monitor connector 230 toward the attachment portion 241C is expressed as "the cell monitor connector 230 is inserted" or just "insertion." Further, a direction where the cell monitor connector 230 is inserted is referred to as an insertion direction S.

The insertion direction S is not parallel to the Y2-direction and has a given angle from a depth side to a near side when it is viewed from the operator W. This is to keep away the exposed portion 241A from a through-hole 249 as far as possible. When the cells 240 are laminated, their through-holes 249 function as a manifold.

Since the intermediate product 250 is rotated in S332, the operator W can easily look into the intermediate product 250 along the insertion direction S. When a line of sight of the operator W is along the insertion direction S, visual inspection can be easily performed. A reason thereof is as follows: no other members disturbing the visual inspection are provided ahead of the line of sight, and the operator W can easily focus the eyes on the guide portion 241B. If the line of sight is along the Y2-direction, the edge of the insulating sheet 243 is observed ahead of the line of sight, so that the operator W cannot easily focus the eyes on the guide portion 241B.

As illustrated in FIG. 7, the reason why the Y1-direction is generally along the insertion direction S is because an angle formed between the Y2-direction and the insertion direction S is a degrees. That is, in S332, the rotation angle is determined so that the insertion direction S becomes the vertical direction. Note that the insertion direction S may have an angle with respect to the Y1-direction in consideration of workability.

When the operator W continues the insertion in a state where the slit portion 231e sandwiches the guide portion 241B, an end of the slit portion 231e on the positive side in the Y3-direction makes contact with the guide portion 241B.

When the operator W further continues the insertion, the slit portion 231e comes off from the guide portion 241B and the cell monitor connector 230 slightly moves toward a negative side in the X1-direction. Then, the first surface 231k makes contacts with the guide portion 241B. At this stage, S334 is completed, and S336 is started. However, it is not necessary for the operator to distinguish or recognize switching between S334 and S336 in order to continuously perform S334 and S336. Further, the operator W may bring the first surface 231k into contact with the guide portion 241B without bringing the end of the slit portion 231e on the positive side in the Y3-direction into contact with the guide portion 241B.

Then, as S336, the operator W performs the insertion with the first surface 231k following the guide portion 241B. Since the first separator 241 is made of titanium, its rigidity is high. On this account, the guide portion 241B can demonstrate a function to guide the insertion.

When the operator W further continues the insertion, the cell monitor connector 230 makes contact with the projection portion 243A, as illustrated in FIG. 8. As illustrated in FIG. 8, a width of the cell monitor connector 230 in the X3-direction is a width L1. That is, a distance between the first surface 231k and the second surface 231m is the width L1. In the meantime, in the X1-direction, a gap between the guide portion 241B and the projection portion 243A is a gap L2. The gap L2 is smaller than the width L1.

On this account, when the operator W further performs the insertion from the state illustrated in FIG. 8, the housing 231, the first separator 241, and the projection portion 243A are elastically deformed. Note that, due to a difference in material and shape, the rigidity of the cell monitor connector 230 and the rigidity of the first separator 241 are markedly higher than the rigidity of the projection portion 243A. On this account, respective deformation amounts of the housing 231 and the first separator 241 are extremely small. As a result, a deformation amount of the projection portion 243A in the X1-direction is generally equal to (L1-L2).

After the projection portion 243A is elastically deformed as described above, when the operator W further performs the insertion and the cell monitor connector 230 reaches a predetermined position, the slit portion 231e sandwiches the attachment portion 241C as illustrated in FIGS. 9 and 11. Hereby, S336 is completed.

In a state where the attachment is completed, the projection portion 243A is elastically deformed, so that the projection portion 243A presses the second surface 231m in the X3-direction. Due to this force, the cell monitor connector 230 is held such that the cell monitor connector 230 is sandwiched between the projection portion 243A and the guide portion 241B.

After that, the operator operates the machine so as to return the angle of the intermediate product 250 to an original angle (S338). That is, the operator rotates the intermediate product 250 by −α degrees, so that the Y1-direction is along the Y2-direction.

With the present embodiment described above, it is possible to easily perform an operation to position the cell monitor connector 230 with respect to the guide portion 241B. When the operator W visually observes a state where the guide portion 241B is sandwiched by the corner of the slit portion 231e, the operator can attach the cell monitor connector 230 just by inserting the cell monitor connector 230. That is, when the operator W visually observes the state where the guide portion 241B is sandwiched by the corner of the slit portion 231e, the operator W can confirm that positioning in the X2-Y2 plane direction (a plane direction of the cell monitor 220) can be accomplished. Thus, good workability is achieved, so that the operator W can attach the cell monitor connector 230 in a short time.

Further, at the time when the guide portion 241B is sandwiched by the corner of the slit portion 231e, the second surface 231m can hardly interfere with other members, as illustrated in FIG. 7. This is because the insertion direction S has an angle of a degrees with respect to the Y2-direction, and therefore, at the time when the guide portion 241B is sandwiched by the corner of the slit portion 231e, no member approaching the second surface 231m in the X2-direction exists. On this account, the operator W can easily perform an operation to sandwich the guide portion 241B by the corner of the slit portion 231e.

Further, the cell monitor connector 230 is held by the first separator 241 by use of elastic deformation of the projection portion 243A, so that the cell monitor connector 230 can be easily attached, and also the cell monitor connector 230 can be easily detached and reattached.

This disclosure is not limited to the embodiment and example in the present specification and is achievable in various configurations within a range that does not deviate from the gist of the disclosure. For example, technical features of the embodiment and example, corresponding to the technical features of the aspects described in SUMMARY, can be replaced or combined appropriately, in order to resolve some or all of the problems described above or in order to achieve some or all of the effects described above. The technical features can be deleted appropriately if the technical features have not been described as essential in the present specification. For example, the following points are exemplified.

The material of the insulating sheet 243 is resin and the material of the first separator 241 is metal, but the disclosure is not limited to this combination. For example, the first separator 241 may be made of conductive carbon and the like.

The operator W may skip the procedure to sandwich the guide portion 241B by the corner of the slit portion 231e and may directly bring the first surface 231k into contact with the guide portion 241B. The rotation angle of the intermediate product 250 may be any angle or the intermediate product 250 may not be rotated.

One cell monitor connector 230 may be attached to each one of the cells 240. Alternatively, one cell monitor connector 230 may be attached to every set of n 3) pieces of the cells 240.

The number of cell monitor connectors 230 included in the connector unit 23 is not limited to any particular number. For example, the number of cell monitor connectors 230 may be one, and in this case, one cell monitor connector 230 itself constitutes the connector unit 23.

The exposed portion 241A may not be exposed from the second separator 242, provided that the exposed portion 241A is exposed from the insulating sheet 243. In this case, at the time when the cell monitor connector 230 is attached, a distal end part of the cell monitor connector 230 may be inserted between the first separator 241 and the second separator 242.

What is claimed is:

1. A method of manufacturing a fuel cell module, the fuel cell module including a fuel cell having a plurality of cells, the method comprising the steps of: attaching a cell monitor connector to a first separator included in at least one cell of the plurality of cells of the fuel cell, the cell monitor connector including a housing and a connection terminal accommodated in the housing, the cell monitor connector being electrically connected to the at least one cell of the plurality of cells of the fuel cell, the at least one cell of the plurality of cells of the fuel cell including a second separator, and a frame-shaped insulating sheet sandwiched between the first separator and the second separator and configured to insulate the first separator from the second separator, the first separator including an exposed portion exposed from the insulating sheet and making contact with the cell monitor connector in a state where the cell monitor connector is attached to the first separator, the exposed portion including an attachment portion making contact with the connection terminal in the state where the cell monitor connector is attached to the first separator, and a guide portion making contact with a first surface of the housing, the insulating sheet including a projection portion projecting toward the guide portion at a position facing the guide portion, a gap between the guide portion and the projection portion in a state where the cell monitor connector is not attached being narrower than a distance between the first surface and a second surface facing the first surface in the housing, the method further comprising:

a positioning step of positioning the first surface by bringing the first surface into contact with the guide portion; and a step of elastically deforming the projection portion due to contact with the second surface by moving the cell monitor connector to a predetermined position with the first surface following the guide portion, so as to sandwich the attachment portion by a slit portion provided in a distal end of the housing.

2. The method according to claim 1, wherein:
the insulating sheet is made of resin; and
the first separator is made of metal.

3. The method according to claim 1, wherein:
the positioning step includes a step of sandwiching the guide portion by a corner of the slit portion before the first surface is brought into contact with the guide portion; and
after the guide portion is sandwiched by the corner of the slit portion, the cell monitor connector is moved toward the predetermined position, so that the first surface is brought into contact with the guide portion.

4. The method according to claim 3, further comprising, before the positioning step, a step of rotationally moving an intermediate product including the at least one cell of the plurality of cells of the fuel cell so that a direction where the cell monitor connector is moved along the guide portion becomes a vertical direction.

* * * * *